United States Patent [19]
Mongerson et al.

[11] 3,835,887
[45] Sept. 17, 1974

[54] VALVE CONSTRUCTION WITH WATER MODULATION

[75] Inventors: Paul A. Mongerson, Elyria; Alfred M. Moen, Grafton, both of Ohio

[73] Assignee: Stanadyne, Inc., Windsor, Conn. ; by said Mongerson

[22] Filed: Feb. 7, 1973

[21] Appl. No.: 330,445

Related U.S. Application Data

[63] Continuation-in-part of Ser. No. 167,239, July 29, 1971.

[52] U.S. Cl...... 137/625.41, 137/625.17, 137/625.3
[51] Int. Cl............................................. F16k 11/07
[58] Field of Search......... 137/625.17, 625.3, 625.4, 137/625.41; 251/206, 207, 208, 209

[56] References Cited
UNITED STATES PATENTS

| | | | |
|---|---|---|---|
| 3,169,549 | 2/1965 | Quick | 137/625.17 |
| 3,387,631 | 6/1968 | Pecis | 137/625.17 |
| 3,460,571 | 8/1969 | Moen | 137/625.17 |
| 3,592,229 | 7/1971 | Moen | 137/625.17 |
| 3,620,254 | 11/1971 | Mongerson et al. | 137/625.17 |
| 3,661,181 | 5/1972 | Palmer et al. | 137/625.17 |
| 3,726,314 | 4/1973 | Moen | 137/625.41 |

*Primary Examiner*—William R. Cline
*Assistant Examiner*—Gerald A. Michalsky
*Attorney, Agent, or Firm*—Kinzer, Plyer, Dorn & McEachran

[57] ABSTRACT

A mixing valve including a body member having inlet passages terminating on the exterior thereof in spaced relation, one from another. A handle member is movable on the body member and defines a mixing chamber. The handle member and body member cooperate to modulate the fluid passing to the mixing chamber to provide a greater degree of handle rotation in the comfort zone.

5 Claims, 17 Drawing Figures

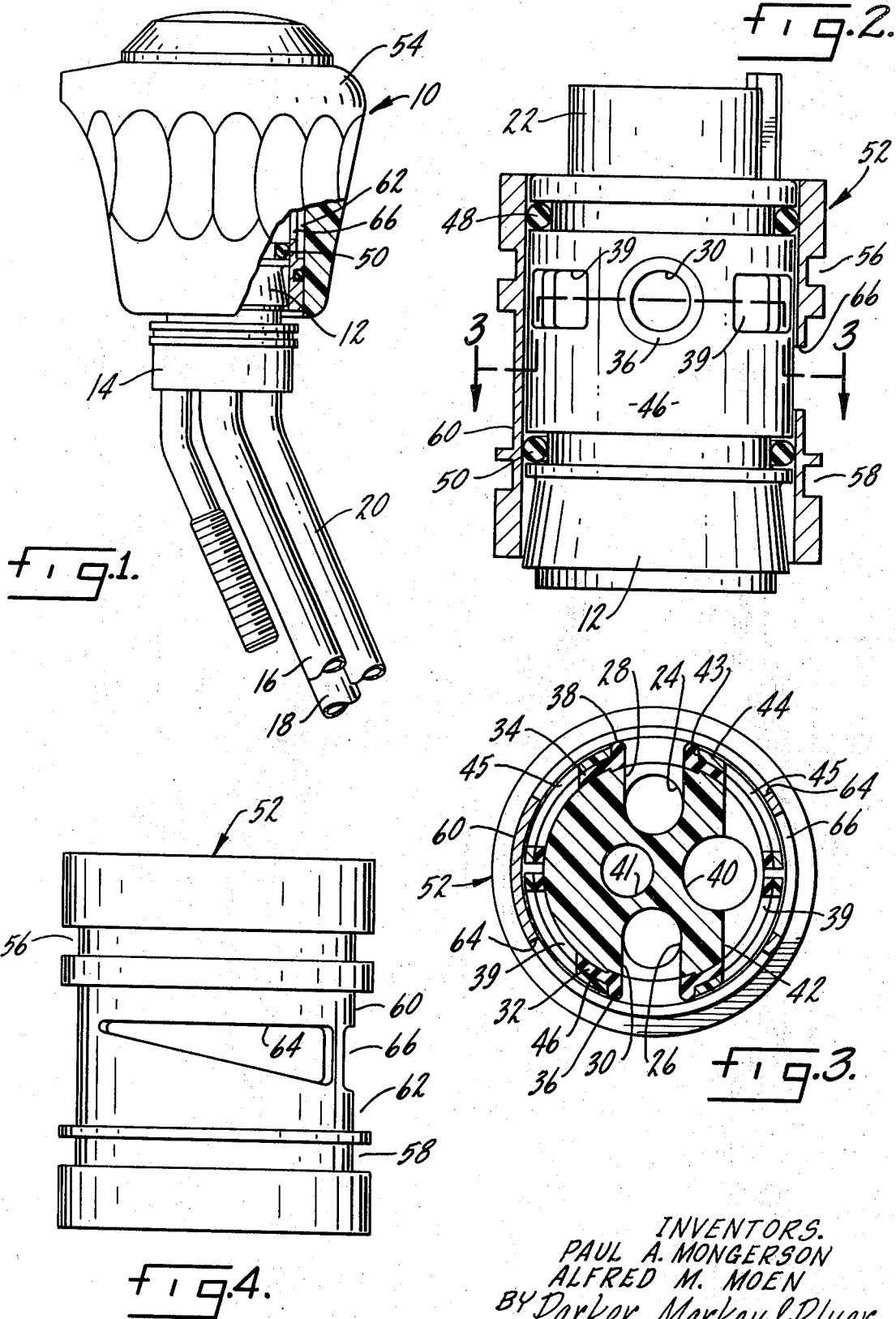

INVENTORS.
PAUL A. MONGERSON
ALFRED M. MOEN
BY Parker, Markey & Plyer
Attorneys.

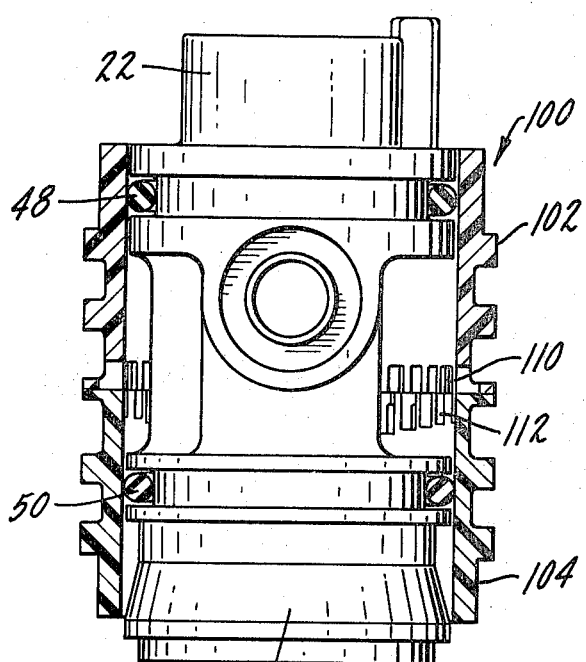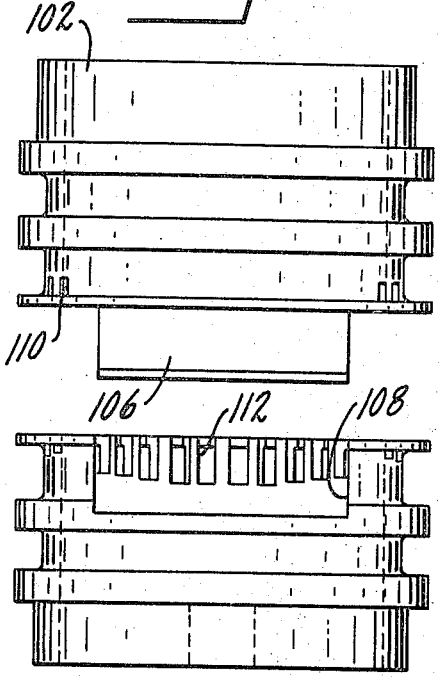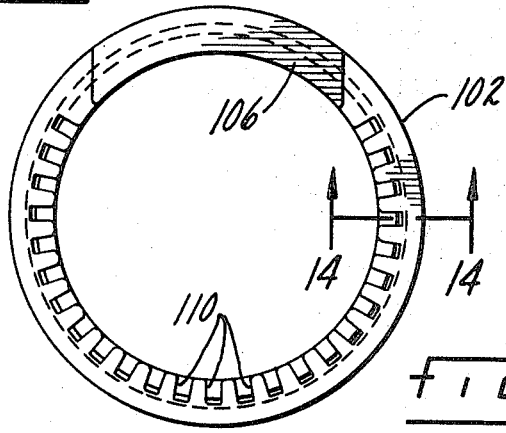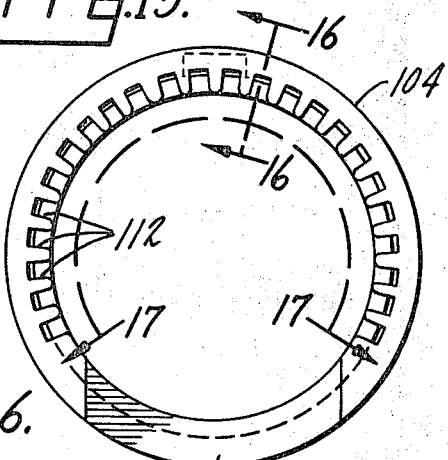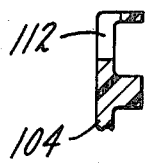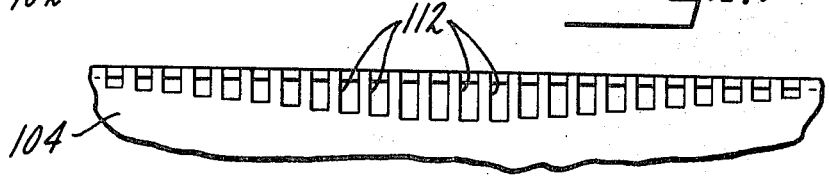

VALVE CONSTRUCTION WITH WATER MODULATION

This application is a continuation-in-part of our co-pending U.S. Pat. application Ser. No. 167,239, filed July 29, 1971, now abandoned.

SUMMARY OF THE INVENTION

The present invention relates to a mixing valve for use in a hot and cold water faucet, with particular relation to the cooperation between the body and the mixing member so as to provide greater movement of the mixing member in the comfort zone.

One purpose is a mixing faucet of the type described in which the mixing chamber is positioned within a movable member which rotates and reciprocates on a body member, with the entrance ports into the mixing chamber permitting a greater degree of handle rotation within the comfort zone.

Another purpose is a mixing valve of the type described in which the mixing chamber is formed by a groove non-concentrically arranged relative to the axis of rotation of the handle.

Another purpose is a mixing valve of the type described in which the inlet ports to the mixing chamber are formed by a pair of generally triangular-shaped openings.

Another purpose is a mixing valve of the type described in which the inlet and outlet ports for the mixing chamber are formed by a series of ports, arranged in rows, there being more ports in one row than the other.

Another purpose is a mixing valve of the type described having means for both temperature and volume modulation of the discharge.

Another purpose is a mixing valve in which the mixing chamber extends less than the entire circumference of the handle.

Another purpose is a mixing valve in which the inlet and outlet ports are arranged in a series with the ports uniformly varying in axial extent.

Other purposes will appear in the ensuing specification, drawings and claims.

BRIEF DESCRIPTION OF THE DRAWINGS

The invention is illustrated diagrammatically in the following drawings wherein:

FIG. 1 is a plan view of a mixing valve of the type described,

FIG. 2 is a partial axial section, on an enlarged scale, illustrating details of the valve of FIG. 1, FIG. 3 is a section along plane 3—3 of FIG. 2, FIG. 4 is a side elevation of the sleeve member illustrated in FIGS. 2 and 3, FIG. 11 is a partial axial section, similar to FIG. 2, showing a modified form of the invention, FIG. 12 is a side view of the handle sleeve, with the sleeve sections separated one from another, FIG. 13 is a bottom view of the sleeve top section, FIG. 14 is a section along plane 14—14 of FIG. 13, FIG. 15 is a top view of the bottom sleeve section, FIG. 16 is a section along plane 16—16 of FIG. 15, and FIG. 17 is an interior view of the bottom sleeve section along line 17—17 of FIG. 15.

DESCRIPTION OF THE PREFERRED EMBODIMENT

Figure 5:
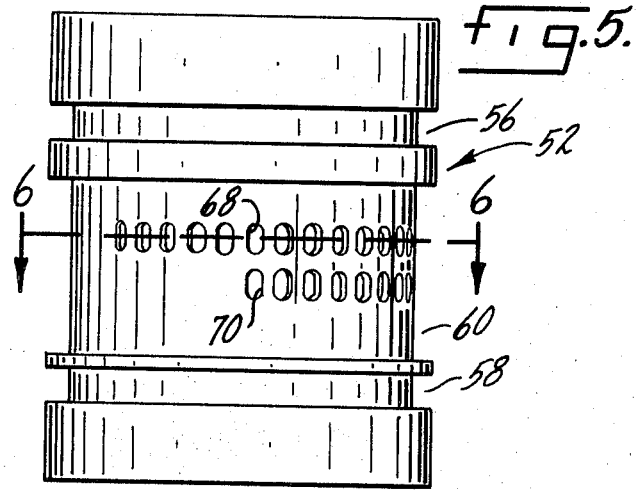
FIG. 5 is a side elevation, similar to FIG. 4, showing a modified form of the invention.

The present invention relates to improvements in a mixing valve of the type shown in U.S. Pat. No. 3,460,571. The invention obviously should not be limited to that particular valve construction, as it has wider application. Valves of the type shown herein and of the type disclosed in the above-mentioned patent find use in the faucet field and may be used in various types of faucet applications, for example in a kitchen, a lavatory, or in a shower-tub combination.

In FIG. 1, a handle member is indicated generally at 10 and may be rotated and reciprocated relative to a generally cylindrical body member 12 illustrated particularly in FIG. 2. The body member 12 sits upon a base 14 having hot and cold water inlet conduits 16 and 18 and a discharge conduit 20. As shown herein, the conduit 20 will convey the mixed hot and cold water to a suitable spout, if the valve is used in a kitchen or lavatory application, or to a shower or tub discharge. The handle 10 may be attached in a suitable manner to an upstanding projection 22 on the body member 12 by a number of means, for example any one of the constructions shown in U.S. Pat. No. 3,592,229.

The body member 12 may have a pair of water inlet passages 24 and 26 which terminate on the exterior of the body member, as at 28 and 30. Rubber seal members 32 and 34 extend circumferentially about the body member, as illustrated in FIGS. 2 and 3, with each of the seal members 32 and 34 having port portions 36 and 38, respectively, which seal against the interior of the handle 10. There are discharge openings 39 in the seal members 32 and 34 to convey water from the mixing chamber described hereinafter to discharge passage 40 in the body member. There is a cut-away portion or slot 42 extending across the body member which is in communication with the passage 40 and with the discharge openings 39 in the seal members 32 and 34. A bore 41 may contain the body member mounting stud, not shown.

Positioned about the seal members 32 and 34 are seal supports 44 and 46 which are generally co-extensive with the seal members and serve to support and maintain the seal members in position on the body member. The seal supports have openings 43 and 45 in alignment with seal openings 39 and the port seal portions 36 and 38, respectively. The body member may be completed by a pair of seal rings 48 and 50 which, along with the seal members 32 and 34 and the seal supports 44 and 46, are positioned within a circumferentially extending recess on the exterior of the body member.

The handle member 10 may be made up of two elements, an interior sleeve 52, illustrated in FIG. 4, and an exterior handle 54, illustrated in FIG. 1. The sleeve 52 has a pair of grooves 56 and 58 holding seal rings which are in sealing contact with the interior of the handle 54. A circumferentially extending recess 60 cooperates with the interior surface of the handle 54 to define a mixing chamber indicated at 62. Water flows into the mixing chamber 62 through a pair of diametrically opposed inlet ports 64. The outlet port for the mixing chamber is indicated at 66.

In operation, the valve of FIGS. 1, 2, 3 and 4 provides modulation of both water temperature and water volume by rotation and reciprocation of the handle 10 upon the body member 12. When the valve is in the position of FIG. 3, equal amounts of hot and cold water from the passages 24 and 26 will flow through the triangular-shaped inlet ports 64 into the mixing chamber 62, from there to the outlet port 66, and into discharge passage 40. It is desirable to have a greater degree of handle rotation within the so-called "comfort zone" so that it is not necessary to have a critical adjustment to provide a comfortable water temperature. The triangular-shaped ports 64 extend a substantial distance of the circumference of the mixing chamber. Thus, through most of the entire handle rotation there will be some mixing of hot and cold water. The length of the ports 64 provides for greater rotation in areas where water is mixed, with the triangular shape of the ports providing a wider range of temperature adjustment.

Figure 6:
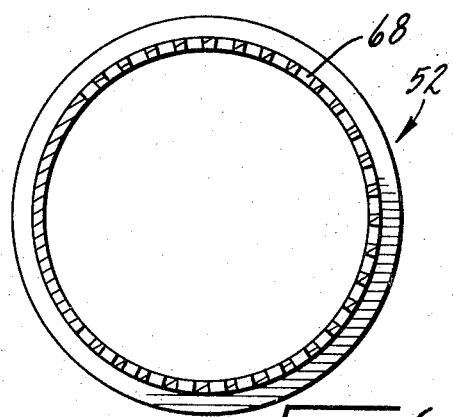
FIG. 6 is a section along plane 6—6 of FIG. 5.

FIGS. 5 and 6 show a modified form of the invention in which like parts have been given like numbers. In this case the triangular-shaped ports 64 and the discharge port 66 have been replaced by two rows of aligned ports indicated at 68 and 70. The rows of ports 68 and 70 extend generally the same circumferential distance as the combination of the triangular ports 64 and discharge port 66 and, thus, they will perform the same inlet and outlet functions. There are less ports in row 70 than in row 68 so that the same effect as triangular ports 64 can be obtained during rotation of the handle. The ports 68 and 70 will provide temperature modulation of the water passing into the mixing chamber and then from there to the water discharge. Again, there will be a greater degree of handle rotation through the comfort zone. There will be on the order of about 180 degrees of handle rotation from full hot to full cold. In addition to the temperature modulation described above, the valves in FIGS. 1-6 provide volume modulation. In the valve of FIGS. 5 and 6, the valve may be opened an initial distance to expose port row 68 if only a small amount of water is desired. In like manner, the initial portion of triangular ports 64 may be in register with the body member passage termination if only a small amount of water is to be used.

Figure 7:
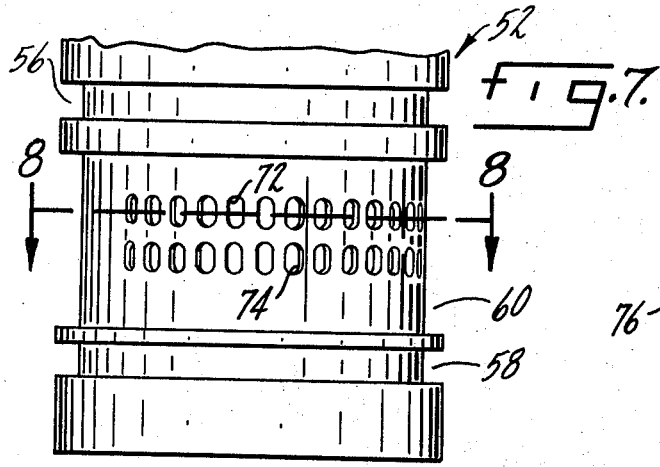
FIG. 7 is a side elevation, similar to FIGS. 4 and 5, showing yet a further form of sleeve member.
Figure 8:
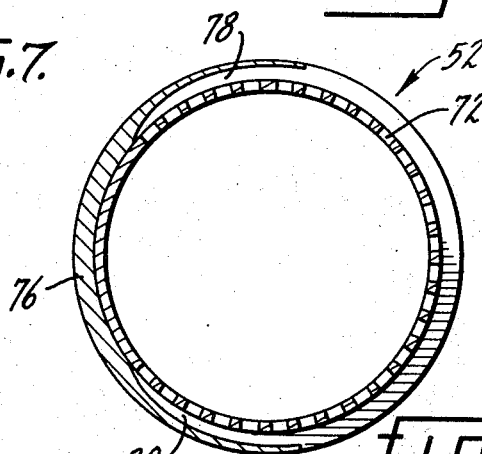
FIG. 8 is a section along plane 8—8 of FIG. 7.

FIGS. 7 and 8 show a further modified form of the invention. The sleeve of FIG. 7 is substantially like that of FIG. 5, except that the rows of ports indicated at 72 and 74 each have the same number of ports. As was true in the construction of FIGS. 5 and 6, the ports are axially aligned, although this is not necessary. The inside of handle 54 is not a smooth cylinder, as was true in the case of the construction of FIG. 3. Instead, there is a cam-like surface 76 which is in contact with the exterior of the sleeve within the recess 60 such that the mixing chamber does not extend completely circumferentially about the handle. The cam-like area 76 may be a separate molded piece, inserted into the mixing chamber, or it may be molded with the handle member. The transition from the cam-like area 76 to the full radial extent of the mixing chamber is gradual, as indicated at 78 and 80, to again provide greater modulation of the water and thus greater rotation of the handle in the comfort zone.

When the valve is in the position shown in FIG. 8, equal portions of hot and cold water will be directed into the mixing chamber. Rotation of the valve toward the hot side will move sloping surface 78 toward the cold water port to gradually reduce the volume of cold water passing to the mixing chamber. When the valve is rotated toward full cold, sloping surface 80 will move toward the hot water port. The length of the mixing chamber combined with sloping surfaces 78 and 80 provides a greater degree of handle rotation within the zone where the hot and cold water are mixed.

Figure 9:
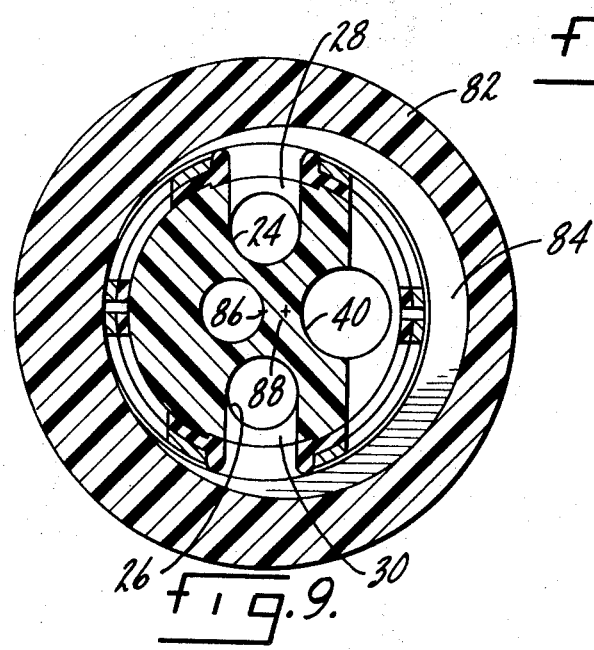
FIG. 9 is a radial section through a modified form of valve member.
Figure 10:
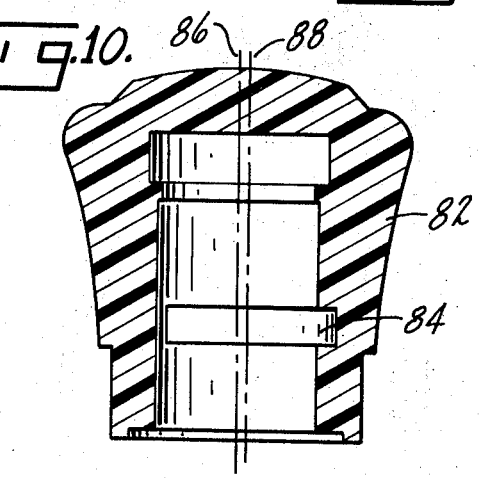
FIG. 10 is a side view, on a reduced scale, of the valve member of FIG. 9.

In the construction of FIGS. 9 and 10, the body is the same as shown in FIG. 2. The handle is of one-piece construction and is indicated at 82. The interior of the handle 82 may have a groove 84, with the remaining portions of the handle being generally cylindrical. The groove 84 may be circular in form, although this is not necessary, but circumscribed about an axis radially offset from the axis of rotation of the handle 82. For example, the axis of rotation of handle 82 is indicated at 86, whereas the axis about which the groove 84 is circumscribed is indicated at 88. Thus, the groove 84 forms a cam-like inner surface which, when the handle is moved to the up position, is in register with the passage terminations 28 and 30. Rotation of the handle is effective to vary hot and cold water, as described above. The offset interior groove 84 provides modulation of the temperature and volume of the water. When the valve is in the position of FIG. 9, equal amounts of hot and cold water will be introduced into the mixing chamber defined by groove 84. As the valve is rotated toward passage 24, there will be gradually decreasing amounts of water from passage 26. When the valve is rotated in the opposite direction, there will be gradually decreasing amounts of water from passage 24. Again, there is a greater degree of valve rotation in the comfort zone, or in the zone where the water from the hot and cold water passages is mixed.

FIGS. 11-17 show a further form of the invention. The body member is similar to that shown in FIG. 2 and the same numbers have been applied. The sleeve forming a portion of the handle is generally designated at 100 and includes an upper sleeve section 102 and a lower sleeve section 104. The two sleeve sections combine to form the outer surface for the mixing chamber illustrated in FIG. 1. The two sleeve sections may be suitably interlocked by a downward-extending arcuate projection 106 on the upper sleeve section 102 which mates into a recess 108 in the lower sleeve section 104. Preferably the sleeve sections are formed of a suitable plastic, although the invention should not be limited to such a material.

The upper sleeve section 102 shown in FIGS. 13 and 14 has a series of generally equally spaced ports 110 which begin generally adjacent the projection 106 and extend circumferentially about the upper sleeve section to the opposite side of the projection 106. Thus, the ports 110 extend substantially about the entire circumference of the sleeve section. The ports 110 have the same axial length.

The lower section 104 has a series of ports 112 which extend generally from one side of the recess 108 to the opposite side of the recess 108. The ports 112 uniformly increase in axial extent from the smallest, adjacent one side of the recess 108, to the largest, opposite the recess 108, and then back to the smallest, generally adjacent the opposite side of the recess 108. Note particularly FIG. 17 which shows the progression in port size.

When the sleeve sections are mounted together, as in FIG. 11, the ports 110 are staggered relative to the ports 112. Thus, each of the ports 112 is positioned between one of the ports 110 and vice versa. The ports, in overall configuration, vary uniformly, from an area of maximum axial extent, in opposite directions, to areas of minimum axial extent. In overall shape, the ports resemble a triangle with the smallest portion of the triangle being adjacent the mating projection and recess 106 and 108 on opposite sides thereof, and with the greatest portion of the triangle being opposite the projection 106 and the recess 108. To that extent, the ports resemble the triangular configuration of FIG. 4. Not only do the ports provide means for passing water into the mixing chamber, but they also provide means for having water flow outwardly from the mixing chamber.

The valve shown in FIGS. 11-17 operates much in the manner of the structure of FIGS. 1-4 and has the advantages described above, namely, that there is a greater degree of handle rotation in the comfort zone, or the zone where the water from the hot and cold water passages has mixed.

The inlet means or openings, in each form of the invention, may be symmetrical and arranged to inversely vary the amounts of hot and cold water admitted into the mixing chamber.

Whereas the preferred form of the invention has been shown and described herein, it should be realized that there may be many modifications, substitutions and alterations thereto.

We claim:

1. A mixing valve including a body member having inlet passages therein, said passages terminating in spaced relation on the exterior of said body member, means movable on said body member and defining a mixing chamber, mixing chamber inlet and outlet means in said movable means to control fluid volume passing into said mixing chamber from said passage terminations including a first and a second series of circumferentially arranged axially extending ports positioned about a substantial distance of the mixing chamber circumference, the ports in the first series being axially disposed relative to the ports in said second series, at least a portion of the ports in one of said series uniformly varying in axial extent, with the ports in the other series being generally uniform in axial extent, the combined port areas of the first and second series being greatest in the center of said series and decreasing in area in both directions from the center.

2. The structure of claim 1 further characterized in that all of said ports have a common edge, with adjacent ports extending in opposite directions from said common edge.

3. The structure of claim 1 further characterized in that said movable means includes a sleeve defining a portion of said mixing chamber, said ports being formed in said sleeve.

4. The structure of claim 3 further characterized in that said sleeve is formed in two sections, with a portion of the ports being formed in one section and the other portion of the ports being formed in the other section.

5. The structure of claim 1 further characterized in that said rows of ports extend for more than 180 degrees of the circumference of said movable means.

* * * * *